Nov. 25, 1952 O. MYERS 2,619,546

PARTY LINE IDENTIFICATION SYSTEM

Filed May 29, 1946 2 SHEETS—SHEET 1

INVENTOR
O. MYERS
BY J W Schmied
ATTORNEY

Nov. 25, 1952 O. MYERS 2,619,546

PARTY LINE IDENTIFICATION SYSTEM

Filed May 29, 1946 2 SHEETS—SHEET 2

INVENTOR
O. MYERS
BY J W Schmied
ATTORNEY

UNITED STATES PATENT OFFICE 2,619,546

PARTY LINE IDENTIFICATION SYSTEM

Oscar Myers, Mount Vernon, N. Y., assignor to Bell Telephone Laboratories, Incorporated, New York, N. Y., a corporation of New York Application May 29, 1946, Serial No. 672,949

23 Claims. (Cl. 179—8.5)

Figure 1:
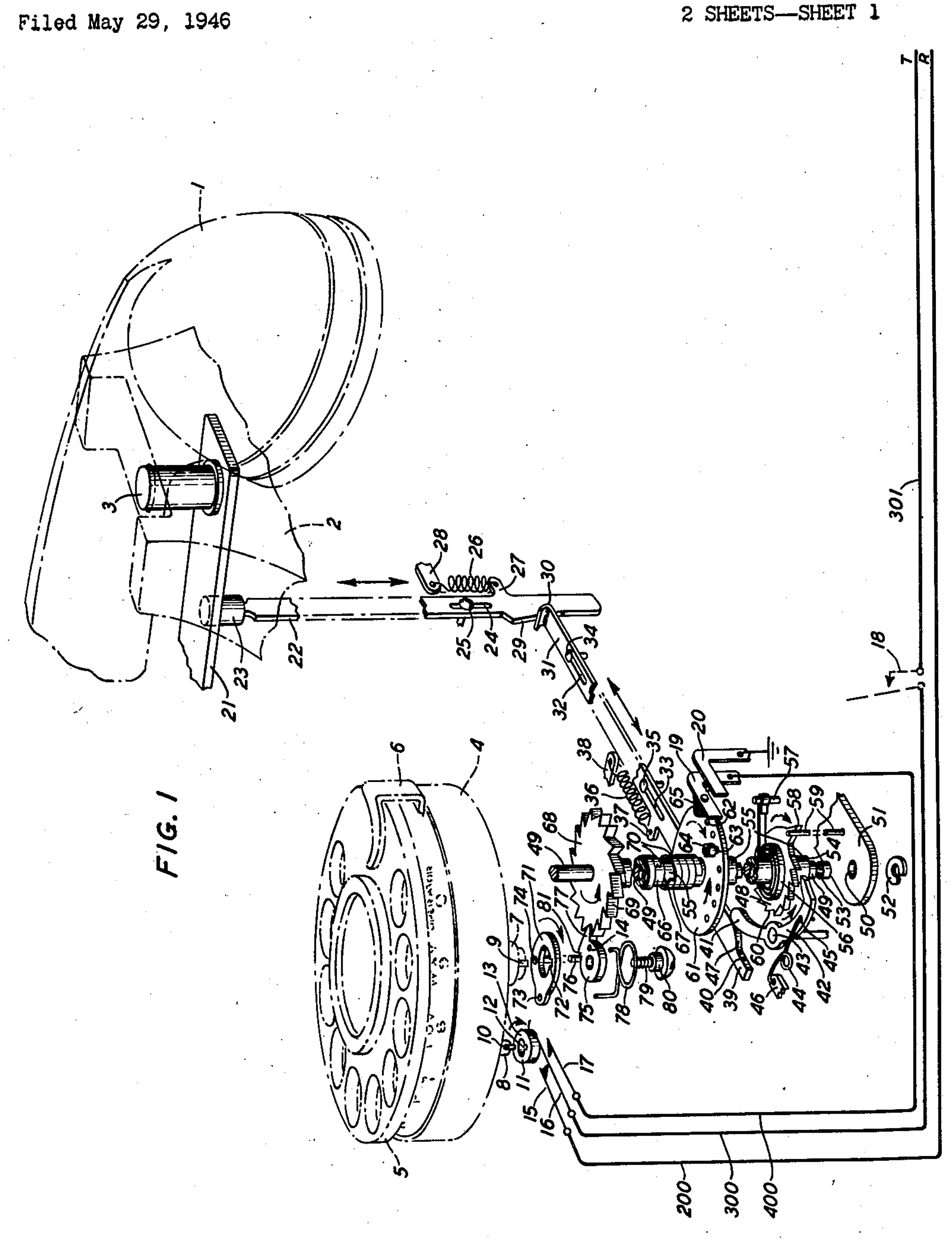

This invention relates to automatic telephone systems and more particularly to systems for identifying calling stations on party lines in such automatic telephone systems.

An object of the invention is to provide an improved method and arrangement for selectively controlling, over a subscriber's line, registering devices at the central office in accordance with an individual characteristic of the calling device or dial at a calling subscriber's station.

A feature of the invention, which enables the foregoing object to be attained, resides in providing differently adjusted auxiliary means in association with the various dials on a party line, whereby operation of a dial and its return to normal, in the transmission of one or more line interruptions representing a digit of the called number, causes application, at the dialing station, of signal potential to the line during transmission of the impulse interruptions of a different one of the digits of the called number as individually prescribed for that station by the adjustment of the auxiliary means thereat.

This feature may be altered slightly to enable the calling device at one station to apply the signal potential to the line during two or more digits of a called number to employ combinations of digits as the identifying characteristic of that station on the party line. The other parties would be enabled to use a different combination of digits.

A further feature resides in means at the central office responsive to pulse interruptions of the line, and simultaneous application of said signal potential thereto, to selectively register said potential application in accordance with the digital impulses during which it is applied. This feature of course may be altered to provide means for selectively registering any combination of digits transmitted, each of which combination is characterized as above by the simultaneous transmission of the signal potential.

In this disclosure the former feature of the invention is characterized in provision at each subscriber's station on the party line of a mechanism actuated by the operation of the dial prior to its release to normal to selectively connect a source of solid ground potential to a switch, by means of which switch the operation of the pulsing motor mechanism of the dial, when the latter is released to normal, will connect the ground potential to the line during the periods of line interruption which correspond to the open dial pulses transmitted by means of the pulsing motor mechanism as it simultaneously opens the line circuit in transmitting the impulses corresponding to a digit dialed. This mechanism is adjustable so that the application of this ground potential is applied to the line during any desired series of impulses, the adjustment being preset to permit the application of the potential during the transmission of one predetermined digit of a called number or during any combination of digital transmissions.

The secondly mentioned feature of the invention is characterized in this disclosure by modification of and addition to the existing relays or apparatus and wiring of an automatic telephone system, such as described in Patent 2,093,117 to W. W. Carpenter, dated September 14, 1937, such that in addition to these apparatus and wiring being responsive to the line interruptions corresponding to the dialing of a digit of a called number, as is their normal function, they will simultaneously therewith be further responsive to the application, at the subscriber's station to the line terminating in this apparatus, of the aforementioned ground signal potential applied during these interruption periods and to register this potential in such a manner as to indicate to the central office monitoring operator which digit or combination of digits dialed by the subscriber caused the application of the potential. The registering of this information, coupled with the aforementioned predetermined setting of the mechanism at the subscriber's station to apply the potential during the dialing of a given digit or given digits will thus inform the operator at the central office with positive indication as to which subscriber of the party line is making the call, each subscriber station on the line being arranged to apply the ground potential during transmission of one different digit of a called number or during a different combination of digits.

The indicator provided at the central office in this disclosure of the invention is a series of lights, each operable by application of the abovementioned ground potential during a different dialed digit of a called number. These lights may be modified as to circuit arrangement to be energized by combinations of digits dialed as previously mentioned.

The foregoing general features of the invention, as well as others, will be apparent from the following detailed description of the construction and operation of the invention with drawings depicting one embodiment thereof, of which drawings the following is a general description:

Fig. 1 shows one feature of the present invention incorporated with existing mechanism and circuits at a calling subscriber's station. The dotted portions of this drawing, except when obviously used to indicate omitted portions of new apparatus, indicate existing conditions, the solid lines indicating mechanism and circuits added in accordance with the present invention. An exploded view in perspective is used to more clearly describe the invention.

Figures 2, 3:
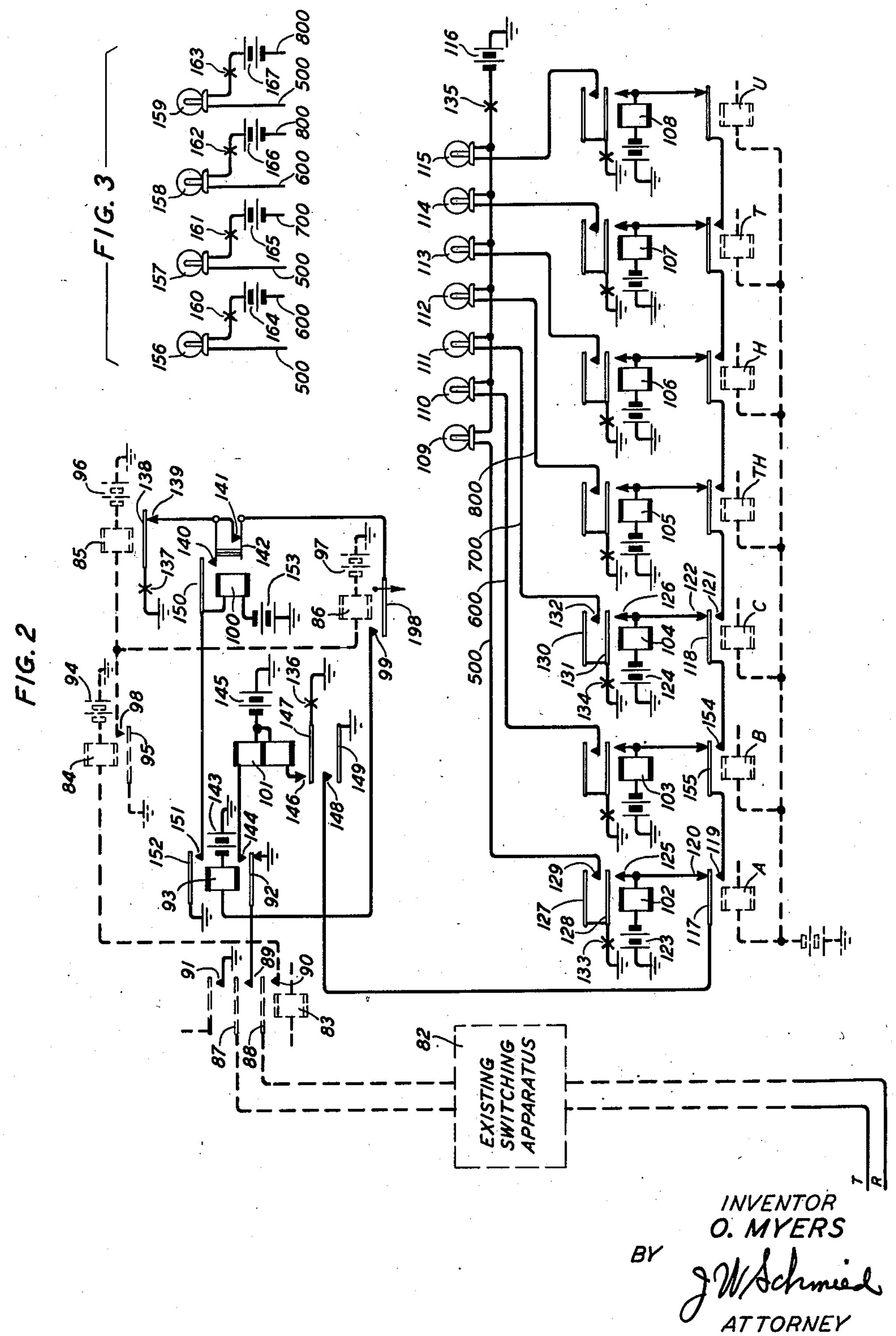

Fig. 2 shows in schematic form another feature of the present invention incorporated with existing circuits and apparatus in a cross bar telephone system such as described in Patent No. 2,093,117 to W. W. Carpenter, dated September 14, 1937. On this drawing, as in Fig. 1, dotted lines indicated existing apparatus and circuits, solid lines indicating newly added apparatus and circuits in accordance with the present invention.

Fig. 3 indicates part of a modification which may be made to the indicating lamp circuits of Fig. 2 to enable the lamps to be responsive to any combination of two digits of a called number transmitted simultaneously with the aforementioned signal potential.

The following is a detailed description of the construction and operation of the invention described above in general terms.

In Fig. 1 familiar apparatus appears; namely, the handset 1 resting in its cradle 2, and thereby depressing a plunger 3, and a dial base 4 carrying a dial 5 and a finger stop 6. Protruding from the bottom of the dial base 4 are two shafts 7 and 8 with shaft keys 9 and 10, respectively, integral thereto. Shaft 7 is a continuation of the shaft upon which the dial 5 is fixed and thereby rotates with the dial 5 at the same angular speed in both directions. Shaft 8 is a continuation of the shaft upon which the pulsing motor mechanism acts and the shaft 8 therefore will make one complete rotation each time the dial 5 rotates a distance corresponding to the separation of two adjacent digit finger holes upon release, after having been set to a given digit by rotation in the clockwise direction. The direction of rotation of the shaft 8 is clockwise only, under the action of the pulsing motor mechanism.

A cam 11 with keyway 12 is press-fitted to the shaft 8, the keyway 12 accommodating in a snug fit the key 10 of shaft 8. The ordinary normally connected pulsing contacts, 15 fixed and 16 movable, are augmented by a third fixed normally open contact 17. The movable contact 16 is switchable from contact with fixed contacts 15 and 17 alternately during operation of the pulsing motor mechanism through the cam 11, and specifically by virtue of the raised portion 13 of the cam 11. Contact 15 is connected to conductor 200 which is the ring conductor R for the subscriber station. Contact 16 is connected to conductor 300 which in turn is in series with the existing hook switch 18 which in turn connects to conductor 301 which becomes the tip conductor T of the subscriber station. Contact 17 is connected to conductor 400 which in turn is connected to a normally open movable contact 19, the action of which is hereinafter described along with that of its cooperating fixed grounded contact 20.

To the bar 21, operated in a well-known manner by plunger 3, a vertically reciprocating bar 22 is attached by means of enlarged end 23 thereof by any suitable means such as welding. The bar 22 is slidably guided in its vertically reciprocating motion by its slot 24 within which fixed pin 25 rides as bar 22 is moved. The bar 22 is urged to its furthermost vertical position by spring 26 attached to lug 27 on bar 22 and to a fixed lug 28. A surface 29 of the bottommost edge of bar 22, inclined in the longitudinal direction of bar 22 at the lower end of same, provides a stop surface for the curved end 30 of a horizontally movable bar 31 such that a change of vertical position of bar 22 will allow the bar 31 to assume a change of horizontal position. Bar 31 is slidably positioned in a horizontal direction by its slots 32 and 33 within which respective fixed pins 34 and 35 ride as bar 31 is moved. Bar 31 is urged towards its furthermost horizontal position in the direction of the vertical bar 22 by spring 36 attached to lug 37 on bar 31 and to fixed lug 38. The end 39 of bar 31, opposite to the curved end 30 of same, is provided with an edge 40 which is cut back from the full width of bar 31 by means of an inclined edge 47 to allow end 41 of a hold pawl 42 to rotate about the hold pawl fixed pivot 43, under the action of spring 44, when the bar 31 is moved by spring 36 to its furthermost position towards the bar 22 when bar 22 is moved vertically by spring 26 allowing the end 30 of bar 31 to change position horizontally by bearing on a different portion of the inclined edge 29 of bar 22. Spring 44, attached to the hold pawl at hole 45 and to a fixed lug 46, urges the pawl and end 41 thereof to rotate counter-clockwise when permitted to do so by the aforementioned necessary position of bar 31 relative thereto as previously explained. When in the position shown in Fig. 1, or its furthermost clockwise position, hold pawl 42 does not engage any teeth 60 of ratchet wheel 48. When in its counter-clockwise position it engages a tooth of ratchet 48.

A shaft 49 is rotatably held in fixed axial and translatory position by fixed plate 51 by means of being inserted into hole 50 in plate 51 until the shoulder 54 of the sleeve 55, rigidly attached to shaft 49, rests on plate 51 and a lock-ring 52 is attached to circumferential groove 53 of shaft 49 on the opposite side of plate 51 from the aforementioned shoulder 54 of sleeve 55. Ratchet wheel 48 is rigidly attached to sleeve 55 and urged in a clockwise direction by coil spring 56 attached thereto and to fixed pin 57. The ratchet wheel 48, in addition to having regular teeth 60 engaged by hold pawl 42, has a stop tooth 58 which engages pin 59 rigidly held by fixed plate 51. This stop tooth 58 and stop pin 59 determine the fully clockwise position of ratchet wheel 48 and sleeve 55 and shaft 49 since the latter three are all mutually attached.

Attached to sleeve 55 is also a disc 61 having holes such as 62 and 63 arranged near its periphery, into any one of which holes such as 63 a knob-ended pin 64 is insertable. This knob-ended pin 64 is so arranged that it will, when rotated by disc 61 to the appropriate position, engage the insulated projection 65 attached to movable contact 19 and thereby move contact 19 to engagement with its cooperating fixed grounded contact 20. There may be more than one knob-ended pin for each disc as will be explained later.

A second sleeve 66 on shaft 49 is separated from sleeve 55 at surface 67 and is rotatable about shaft 49 as a shaft bearing and upon the upper end of sleeve 55 as a thrust bearing. Ratchet wheel 68 is rigidly attached to sleeve 66 but not to shaft 49. Attached to ratchet wheel 68 is a spring clutch 70 which extends over sleeve 55 but is not attached thereto. The spring clutch 70 is arranged to slide over sleeve 55 when ratchet wheel 68 is rotated clockwise and to frictionally grip sleeve 55 and rotate same with it when ratchet wheel 68 is rotated counter-clockwise.

To shaft 7, connected to dial 5, a washer 71, having a keyway 72, is attached such that the key 9 of shaft 7 will be accommodated by keyway 72 of washer 71 such that the washer 71 will rotate with shaft 7. Machine screw 79 is fastened to a suitably tapped hole in shaft 7 and in so doing holds the pawl disc 75 and spring 78 in such a position that the pawl disc 75 will rotate about the shaft bearing surface 80 of screw 79 and between the head of the screw 79 and the washer 71 as end bearings. Spring 78 is attached to the disc pawl 75 at hole 14 therein and to the washer 71 at hole 73. A pin 76 is rigidly attached to washer 71 at 74 and engages a stop surface 81 on the operating tooth 77 of disc pawl 75. The tooth of disc pawl 75 is arranged to engage teeth 69 of ratchet wheel 68.

The operation of the mechanism of Fig. 1 previously described from a construction standpoint is as follows. When the handset 1 is lifted from the cradle 2, when a subscriber desires to initiate a call, the plunger 3, bar 21 and consequently bar 22 are allowed to move vertically under the action of spring 26, the hook switch 18 being closed simultaneously. This movement will permit the end 30 of bar 31 to move horizontally under the action of spring 36 to a new position abutting against a new part of the inclined edge 29 of bar 22. When bar 31 moves horizontally to the right, the end 41 of hold pawl 42 will be rotated counter-clockwise under the action of spring 44 along the inclined edge 47 of bar 31 and will rest in the depression made by the cutback edge 40 of the end 39 of bar 31. In this rotation the hold pawl 42 will engage one of the normal teeth 60 of ratchet wheel 48. The ratchet wheel 48 is held by means of its stop tooth 58 against the stop 59 on plate 51 by the action of spring 56.

When the dial 5 is rotated clockwise to finger stop 6, to dial the first digit of a called number, the shaft 7 will rotate clockwise therewith and will carry washer 71 with it. Washer 71 by means of pin 76 attached thereto will engage the stop surface 81 on the operating tooth 77 of disc pawl 75 and rotate the pawl 75 clockwise such as to enable the tooth 77 to engage a tooth 69 of ratchet wheel 68 and rotate the latter one step counter-clockwise. As the ratchet 68 and sleeve 66 and spring clutch 70 attached thereto rotate one step counter-clockwise the spring clutch 70 will frictionally grip sleeve 55 and rotate same one step counter-clockwise. Shaft 49 and ratchet wheel 48 attached to sleeve 55 will thereby be rotated one step counter-clockwise also. In this rotation of ratchet 48 the hold pawl 42 will slide over a tooth on ratchet 48 and engage the next succeeding tooth on the ratchet 48 to hold same in an advanced position of one step. In the rotation of sleeve 55 the disc 61 attached thereto will be rotated one step counter-clockwise also. The rotated step of disc 61 will be sufficient to move a hole such as 62 into position of being adjacent the knob 65 on contact 19. There is then no operation of contact 19 since the hole 62 does not house the knob-ended pin 64 which actuates the contact 19 by engaging with the knob 65.

When the subscriber removes his finger from the finger hole of dial 5, allowing the disc to return to normal by rotating counter-clockwise, the shaft 7 is rotated counter-clockwise to its original position carrying washer 71 with it. The spring 78 will force the disc pawl 75 to follow the washer 71 and in so doing will engage the tooth 69 of ratchet wheel 68 in the reverse direction as previously and will rotate the wheel 68 back to its original position. In rotating clockwise the ratchet wheel 68 which is attached to sleeve 66 and spring clutch 70 will carry these latter two with it. The spring clutch 70 when rotating clockwise will unwind from and frictionally disengage the sleeve 55 and so will not tend to rotate same clockwise. So the sleeve 55 with the disc 61 remain as moved previously.

While the dial 5 is returning to its normal position in a counter-clockwise rotation the pulsing motor mechanism will rotate the shaft 8 and attached cam 13. The shaft 8 and cam 13 will make one complete revolution each time the dial 5 revolves a distance equal to the separation of adjacent finger holes of dial 5. It is seen that the cam 13 in rotating will break the normally closed contacts 15 and 16 and make the normally open contacts 16 and 17. Thus a series of open pulses is sent out along the TR circuit and the connection of contacts 16 and 17 does nothing since contacts 19 and 20 are open.

The operation described above is identical for the second digit and the disc 61 is rotated one more step. The second hole, similar to 62, has no effect on the knob 65. However, upon a succeeding operation of the dial 5 corresponding to the dialing of a third digit the disc 61 will be seen to be rotatable to a position where the knob-ended pin 64 will engage the knob 65 of contact 19 and close the connection of contacts 19 and 20 and that operation of the cam 13 subsequent to release of the dial 5 on this digit will not only send open dial pulses on the TR circuit but will also send a series of solid ground pulses over the T line when contacts 16 and 17 are connected since contacts 19 and 20 are now closed.

The knob-ended pin 64 may be inserted in any hole 63 to correspond to any digit of the called number and so by this above-described mechanism it is possible to send solid ground pulses over the T line during open pulses of any predetermined digit dialing of a called number and to prevent the sending of solid ground pulses over the T line during open pulses of any other digit at any one setting of the knob-ended pin 64. It is clear, of course, that more than one knob-ended pin such as 64 may be employed with one disc 61 such that each station may transmit the ground potential during any desired combination of digits of a called number, the combination different with each station on the party line.

When the handset 1 is replaced on the cradle 2 at any time plunger 3, bar 21 and bar 22 are depressed forcing bar 31 to the left and forcing the hold pawl 42 to rotate clockwise by virtue of the end 41 thereof riding up the inclined edge 47 of the end 39 of bar 31 and releasing the ratchet wheel 48. The spring 56 will rotate the ratchet wheel 48 clockwise to its original position determined by stop tooth 58 of ratchet wheel 48 engaging stop pin 59 on plate 51.

In Fig. 2 the apparatus and wiring shown in dotted lines are so represented as being apparatus and wiring existing in a telephone system such as disclosed in Patent 2,093,117 to W. W. Carpenter, dated September 14, 1937, previously referred to herein.

The tip and ring conductors T and R of Fig. 1 from the subscriber station, in passing through existing switching apparatus 82, fully described in the above patent, eventually terminate in an idle register sender on two normally open contacts 87 and 88, respectively, on the present cut-through relay 83 of said idle sender, designated as 2200 on Fig. 22 of the reference patent. The contact 89 of relay 83 normally is connected to the ground strap 91; but, in order to employ the present invention this strap is removed and contact 89 is connected to a normally grounded armature 92 of a newly added so-called tip transfer relay 93. The existing contact 90 of relay 83 is normally connected to the coil of relay 84, the present L relay associated with the idle sender and designated by 2207 on Fig. 22 of the reference patent, the other lead of the coil of relay 84 being normally connected to ground through a battery 94, as shown. The L relay 84 normally controls the coil circuit of the present L1 relay 85 associated with said idle sender designated by 2300 on Fig. 23 of the reference patent, and is unmodified in the use of the present invention. The grounded armature 95 of the L relay 84 is normally disconnected from the coil circuit of the L1 relay 85. When the L relay 84 is operated the grounded armature 95 thereof closes a circuit from ground through the coil of the relay 85, through battery 96 to ground, operating relay 85. This armature 95 of the L relay 84 also completes the coil circuit of relay 86, a present slow-release (SR) relay associated with the idle sender and designated as 2211 in Fig. 22 of the reference patent, through battery 97 to ground.

The remaining elements of the apparatus already existing which are used in the performance of this invention are the hold magnets A, B, C, TH, H, T and U, designated as such by respective numbers 2621, 2630, 2634, 2637, 2657, 2660 and 2663 on Fig. 26 of the reference patent, these hold magnets being also associated with said idle sender.

In short, the operations of these existing apparatus parts, are as follows: At a given predetermined time, subsequent to closing of the hook switch at the subscriber station but before any dial pulses are transmitted therefrom as explained in detail in the reference patent, the cut-through relay 83 will operate and be so locked, thus closing the coil circuit of the L relay 84 from the grounded armature 92 of the tip transfer relay 93, through the now operated contact 90 and inner upper operated armature 88 of the relay 83, around the tip ring circuit, through the now operated upper middle armature 87 and operated contact 89 of relay 83, through the coil of relay 84 to ground through the battery 94. Relay 84 will operate energizing relay 85 by means of completing its coil circuit through the now operated armature 95 and operated contact 98 of relay 84. Relay 86 also will be energized by the operated armature 95 and contact 98 of relay 84 completing the coil circuit of SR relay 86. The hold magnets A, B, C, TH, H, T and U operate successively after the completion of transmission of the series of dial pulses corresponding to digits successively transmitted by the subscriber. The A magnet will operate at the conclusion of transmission of the first digit pulses, B at the conclusion of the transmission of the second digit pulse, etc.

As the pulsing cam 13 of Fig. 1 transmits the open dial pulses of a called digit over the TR circuit, the cut-through relay 83 will remain locked in the operated position, the L relay 84 will release and operate with the pulse interruptions thereby forcing the L1 relay 85 to do likewise. The SR relay 86, however, due to its slow release characteristic will remain operated over the short periods when its coil circuit is deenergized by the release of the L relay 84 during the open pulses transmitted from the subscriber.

New armature 138 and contact 139 are added to the L1 relay 85 such that normally they are in mutual contact and become separated when L1 relay 85 is operated. Armature 138 is connected to ground through a switch 137. Relay 100 is added with armature 150 and contacts 140, 141 and 142. Armature 150 is normally not connected to contact 140 which is wired to the contact 139 of the L1 relay 85. Also wired to the contact 139 of L1 relay 85 is contact 141 of relay 100, contact 142 of relay 100 being normally connected to contact 141 thereof. The coil circuit of relay 100 is connected from armature 150 on one side through battery 153 to ground on the other side. The action of armature 150 and contact 142 of relay 100 is such that when the relay 100 is energized armature 150 moves into contact with contact 140 and contact 142 separates from contact 141. Contact 142 of relay 100 is wired to a newly added normally unoperated armature 198 of the SR relay 86. A second newly added contact 99 of the SR relay 86 connects to armature 198 thereof when the SR relay 86 is operated.

A new tip transfer relay 93 is added, the coil circuit therefor extending to ground on one side through battery 143 and wired to contact 99 of the SR relay 86 on the other side. The normally grounded armature 92 of the tip transfer relay 93 has been mentioned previously. It is normally separated from its cooperating contact 144 of the same relay. A second armature 152 of relay 93 is wired to ground and normally separated from its cooperating contact 151 of the same relay. Contact 151 of relay 93 is wired to the armature 150 of relay 100. Contact 144 of relay 93 is wired to one side of the operating coil of newly added ground pulse detecting relay 101, the opposite side of which coil circuit extending to ground through battery 145. There is a hold coil on the relay 101, one side of which connects to battery 145, the other side being wired to a normally open contact 146 of relay 101. The contact 146 is separated normally from its cooperating armature 147 which is wired to ground through a switch 136. There is another contact 148 normally separated from armature 149 on relay 101, the armature 149 of which is wired to ground and the contact 148 of which is wired to a newly added armature 117 of the present hold magnet A. Two newly added contacts 119 and 120 on the present hold magnet A are arranged so that normally armature 117 connects to contact 120 and contact 119 is separated from armature 117. The operation of hold magnet A will separate armatures 117 and contact 120 thereof and connect armature 117 and contact 119. Similar sets of an armature and contacts are added to each of the hold magnets such as 118, 121 and 122 on hold magnet C. The contact 120 of hold magnet A is wired to one side of the coil of a new party indicating relay 102, the other side of which coil is connected to ground through battery 123. There are two contacts and two armatures on the relay 102, all normally open. Armatures 127 and 128 are wired together and to ground through a switch 133. Contact 125, which is normally separated from but cooperating with armature 128, is connected to previously mentioned contact 120 of hold magnet A. Contact 129, which is normally separated from but cooperating with armature 127, is wired to one side of a party indicating lamp 109 by wire 500, the other side of the lamp 109 being wired to ground through switch 135 and battery 116. There is one party indicating relay 102, 103, 104, 105, 106, 107 and 108, respectively, for each hold magnet A, B, C, TH, H, T and U. There is one party indicating lamp 109, 110, 111, 112, 113, 114 and 115 for each respective party indicating relay and hold magnet such as party indicating relay 104 for hold magnet C for party indicating lamp 111. The party indicating relays are all wired identically except that each one energizes a separate lamp, the lamps all being in parallel as to the switch 135, battery 116 and ground. The newly added normally disconnected contacts of the hold magnets such as contact 119 of magnet A and contact 154 of magnet B are wired respectively to the newly added normally unoperated armature of the next succeeding hold magnet such as armature 155 of magnet B and armature 118 of magnet C, respectively. It is not deemed necessary to amplify this since the drawing of Fig. 2 clearly shows the repetitive nature of this group of connections.

For the sake of describing the detailed operation of the invention initial reference is made to Fig. 1. In view of previous detailed descriptions of the operation of the mechanism of Fig. 1 it is sufficient for the sake of the understanding of the operation of Fig. 2 to say that when the handset 1 is lifted preparatory to dialing the digits of a called number, the TR loop is closed by the operation of the switchhook 18 and by virtue of the initially closed contacts 15 and 16. Eventually, by reason of apparatus described in the referenced patent, relay 83 operates and is locked operated connecting the line to an idle register sender. Contact 89 and armature 87 of relay 83 meet and contact 90 and armature 88 meet to complete the coil circuit of the L relay 84 through the TR loop to ground by way of armature 92 of relay 93. When the L relay 84 operates, contact 98 and armature 95 thereon meet completing to ground the coil circuits of the $L_1$ relay 85 and the SR relay 86, each of which then operates. The $L_1$ relay 85 in operating opens connecting armature 138 and contact 139 thereon, switch 137 being closed. When the SR relay 86 operates, armature 198 and contact 99 thereon are connected. Nothing further happens to the circuit of Fig. 1 until the dial 5 of the subset is released from its operated position to transmit open dial pulses along the TR loop.

When the dial 5 is moved clockwise to stop 6 prior to release, the ratched mechanism of Fig. 1 moves the disc 61 one step counter-clockwise and locks it there. As shown in Fig. 1, this is the position which will make the first hole in the disc 61 become adjacent the knob 65 of contact 19. Since the knob-ended pin 64 carried by disc 61 is in the third hole 63, contacts 19 and 20 will not be connected.

Upon release of the dial 5 the cam 13 will open and close the contacts 15 and 16 a number of times corresponding to the digit dialed. Each time the TR loop is opened in this manner, relay 83 being locked in the operated position, the L relay 84 will release allowing the $L_1$ relay 85 to also release thus connecting armature 138 and contact 139. The coil circuit of the SR relay 86 will simultaneously be deenergized but the relay 86 will remain operated due to its slow release characteristic which is sufficient to hold it operated during open pulses of a dialed digit. Thus armature 198 and contact 99 thereon will remain connected. The coil circuit of the tip transfer relay 93 is now completed from ground through battery 143, the coil, closed contact 99 and armature 198 of the SR relay 86, the closed contacts 142 and 141 of relay 100 and the closed contact 139 and armature 138 of the $L_1$ relay 85 to ground through switch 137. The relay 93 will be operated at this point connecting armature 92 and contact 144 thereon and contact 151 and armature 152 likewise. When contact 151 and armature 152 of relay 93 are so connected, the coil current circuit of relay 100 is completed from ground, through closed contact 151 and armature 152 of relay 93, through the coil of relay 100 to ground through battery 153. Relay 100 will operate breaking the connection between its normally closed contacts 141 and 142 and connecting its normally separated contact 140 and armature 150. It is seen that relay 100 by virtue of its contact 140 and armature 150, when closed, completes its own holding circuit by way of closed contact 139 and armature 138 of the $L_1$ relay 85 to ground through switch 137.

Referring to Fig. 1 again it is noticed that as contacts 15 and 16 are separated by the rotation of the cam 13, contacts 16 and 17 are connected. Thus, during each open pulse on the TR line, the tip conductor 300 is connected to the movable contact 19 associated with the ratchet and disc mechanism of Fig. 1. The knob-ended pin 64 on disc 61, in the movement corresponding to the dialing of the first digit, has not engaged the knob 65 of contact 19. It is seen that this will not occur until the third digit is dialed since the knob-ended pin 64 is in the third hole 63 of disc 61 and is thus three ratchet steps from engagement with the knob 65 of contact 19.

When relay 93 operated, connecting armature 92 and contact 144 thereon, the ground pulse detecting relay 101 would have had a complete coil circuit if the tip conductor were grounded. Since the first step of the ratchet of Fig. 1 did not connect contacts 19 and 20, the tip conductor, during interruptions in the TR loop caused by the cam 13, is not grounded and relay 101 will not operate. Also, when the contacts 141 and 142 of relay 100 are separated by the operation of this relay, the coil circuit of relay 93 will be broken and relay 93 released allowing armature 92 thereon to again ground itself as normal. Contact 151 and armature 152 of relay 93 will also separate removing one ground from the coil circuit of relay 100, which has established its own holding circuit by this time. However, as previously described the cam 13 will allow contacts 15 and 16 to close subsequent to the first open pulse of the first dialed digit thus closing again momentarily the TR loop and again complete the coil circuit of the L relay 84. The L relay 84 operates, allowing the SR and $L_1$ relay to be reenergized. The operation of the $L_1$ relay 85 will open the holding circuit of relay 100 which releases to normal. The apparatus will then be back to its condition at the moment previously when the first digit had been set up on the dial but the dial had not yet been released to send the open pulses corresponding to that digit.

It is not considered necessary to repeat the above steps for each open impulse of each digit. It is, however, important to note that upon dialing the third digit, the mechanism of Fig. 1 will have moved the disc 61 three steps causing the knob-ended pin 64 to engage the knob 65 of movable contact 19 and so move contact 19 into connection with the contact 20 which is grounded. This will effectively ground the tip conductor during open pulses since the cam 13 not only opens the TR loop by separating contacts 15 and 16 but during that period connects contacts 16 and 17. It is also to be noted that at the completion of transmission of the first digit pulses the hold magnet A operated and locked and that at the completion of the transmission of the second digit pulses the hold magnet B operated and locked.

Retracing the description slightly, it will be remembered that during open pulses the armature 92 and contact 144 of relay 93 were connected. If the tip conductor is grounded, the relay 101 will have a complete coil circuit from this ground, through its coil, and through battery 145 to ground. Upon operating at this instant, relay 101 closes its own hold circuit by closing its normally open contact 146 to armature 147 to ground through switch 136. Also normally open contact 148 and armature 149 of relay 101 will be closed. The coil circuit of party indicating relay 104 will then be complete from ground, through closed contact 148 and armature 149 of relay 101, through operated armature 117 and contact 119 of the operated and locked hold magnet A, through operated armature 155 and contact 154 of the operated and locked hold magnet B, through unoperated aramture 118 and contact 122 of unoperated hold magnet C and through the coil of relay 104 to ground by way of battery 124. Upon operating, relay 104 closes its own hold circuit by closing normally open contact 126 and armature 131 thereon to ground through switch 134. Relay 104, in operating, also closes normally open armature 130 and contact 132 thereon, thus extending from ground through a switch 134 a completed circuit for party indicating lamp 111 by wire 700 back to ground through switch 135 and battery 116.

It is the result then that party indicating lamp 111 was lit by the subscriber station which contained the mechanism illustrated in Fig. 1 in which the important feature, as far as the foregoing description is concerned, is that the knob-ended pin 64 was in the third hole 63 of disc 61. This fact, as has been shown, resulted in this particular subset of the party line producing a lighted lamp 111 as a called number was dialed and specifically as the third digit of that number was transmitted.

It is sufficient to say at this point that since the knob-ended pin 64 can be preset to any given hole such as 63 of the disc 61 at the time of installation, or subsequently for that matter, this invention will permit positive party identification of each calling party thereon, each party's subset mechanism being characterized by a different setting of the knob-ended pin 64 to effect the lighting of a different lamp 111 capable of being seen by a monitoring operator. It will be noted that, assuming the holding circuit of relay 101 to be operative by means of switch 136 being closed, once relay 101 has operated and locked responsive to a signal during a particular digit it will remain operated until the switch 136 is opened. Under the assumed conditions therefore lamps 111, 112, 113, 114 and 115 will all light in succession upon the operation in succession of hold magnets C, TH, H and T. Nevertheless the operation of the first lamp 111 will identify the calling party. However, the switch 136 may be left open entirely because the combined operate time of relay 100 and release time of relay 93 will be sufficient to enable the party identification relay such as relay 102 to be operated by the operation of relay 101. Furthermore, the switch 136 could represent contacts on any relay of the system which has an operating cycle corresponding to the dialing of digits so that the holding circuit of relay 101 would be opened at the end of each digit and closed upon the dialing of the next digit. Automatic systems always include at least one such relay, as is well known in the art.

In regard to the monitoring last mentioned, it is seen by an examination of Fig. 2 and the above-detailed description that reference is made to switches 137 of the $L_1$ relay 85, 136 of relay 101, 133 of relay 102, 134 of relay 104 and 135 associated with lamps 109 through 115. These switches may be operable manually by the monitoring operator separately or simultaneously and may be so operable automatically by suitable additional relays controlled by the calling subscriber's set mechanism or controlled by the monitoring operator. The effect of operating these switches is to release previously described relay holding circuits, to prevent operation of the circuits invented or merely to prevent lighting of lights, any one of which, or any combination of which, may be desirable in the practice of the invention but which are not considered important as to detailed description herein. It is also apparent that the lights 109 through 115 used in this disclosure as the indicating means may be replaced by any other desirable such means including circuit controlling means or meters without departing from the spirit of this invention.

In conclusion, by reference to Fig. 3, it is clear that new lamp 156 is connected, one side to conductor 500 and relay 102 the other side to conductor 600 and relay 103 through switch 160, similar to 135 of Fig. 2, and battery 164. By means of this slight modification to the indicating lamp circuits of Fig. 2 the party indicating lamp 156 will not be energized until both relays 102 and 103 have been operated to complete the circuit for lamp 156 through grounds on both relays 102 and 103. In order to energize or operate both relays 102 and 103, it is clear that knob-ended pins such as 64 of Fig. 1 must have been in both the first and second holes of the disc 61. By this arrangement the particular party, on the party line, which has this feature will cause lamp 156 to light as the party dials the first two digits of a called number. It is, of course, obviously possible by slight modification to the wiring of the relays 102 through 108 to enable the indicating lamps to be energized only by a combination of digits of more than two, this, of course, requiring more than two knob-ended pins to each party subset disc 61. The lamps 157, 158 and 159 illustrated in Fig. 3 are shown to be energized respectively by the first and third digits, the second and fourth and the first and fourth, it not being considered necessary to illustrate the remaining seventeen possibilities of this two-digit coded arrangement. It is obvious that in order for the lamps to properly register only the combination of digits corresponding to the combination of digits during which the signal was transmitted, the holding circuit for relay 101 must be immobilized by, for instance, opening switch 136 under such circumstances. Such is necessary in order to prevent each lamp, after the first one lights, from being lighted in succession to thereby prevent proper combination identification. With switch 136 opened during the identifying process, it will be apparent that the combined operate time of relay 100 and release time of relay 93 must be sufficient to enable the operation of the pertinent party identification relay or relays 102 through 108 after the operation of relay 101, as previously explained. The holding circuit for relay 101 could be eliminated entirely from the circuit of Fig. 2 but may, on the other hand, be desired to be retained for use in connection with signal lamp identification. Also the holding circuit, switch 136 in particular, could be under the control of a relay whose operate and release cycle corresponds to the dialing of successive digits, as previously explained.

The invention embodied in the foregoing description is not meant to be limited in scope thereto or to applications to the exemplary telephone system referenced herein, but is limited only to the scope of the appended claims.

What is claimed is:

1. In an automatic telephone system including a line circuit, a plurality of stations thereon, a central office terminating one end of said line, and a calling device at each station, a source of signal potential at each station, means under the control of each of said calling devices for applying said signal potential to the line in a predetermined relation, differing with each station, to the sequence of digits of a called number simultaneously applied to the line by one of said calling devices, and means at the central office selectively responsive to the relation of digits of the called number to the signal potential so applied to the line.

2. In an automatic telephone system including a central office, a line terminating therein, a plurality of stations on said line, and a calling device at each station, a source of signal potential at each station, means under the control of each station calling device for applying said potential to the line simultaneously with at least one digit of a called number transmitted by one of said calling devices, said one digit differing for each device, and means at the central office adapted to selectively register the transmission of said potential with different digits of called numbers.

3. In an automatic telephone system including a line circuit, a plurality of stations thereon, a central office terminating one end of said line, and a calling device at each station for transmitting groups of line interruptions representing digits of a called number, a source of signal potential at each station, means under the control of each of said calling devices for connecting the signal potential to the line during the interruption intervals of at least one digit of the called number, said one digit different for each device, and means at the central office responsive during at least one of said groups of line interruptions to the simultaneous connection of said potential source to the line to selectively register the connection of said source to said line in accordance with its occurrence in the series of digits transmitted.

4. In an automatic telephone system including a central office, a line terminating therein, a plurality of stations on said line, and a dial at each station adapted to interrupt the line at least once in response to each operation and return to normal of the dial to transmit the impulses of a digit of a called number, a source of signal potential at each station, means under the control of each station dial for applying said potential to the line during the line interruptions representing at least one digit, different with each station, and means at the central office responsive to interruptions of the line and simultaneous application thereto of said signal potential to selectively register the application to the line of said signal potential in accordance with the digital line interruptions during which the said potential was so applied.

5. In an automatic telephone system including a central office, a line terminating therein, and a plurality of stations on said line, each station having a dial and a source of signal potential thereat, a station identification system comprising means under the control of the dial of each station for applying said potential to the line simultaneously with at least one digit of a dialed number, a different digit with each station, and means at the central office selectively responsive to the simultaneous application to the line of the potential and at least one digit, whereby a register at the central office is operated to indicate the station dialing a called number.

6. In an automatic telephone system including a central office, a line terminating therein, and a plurality of stations on said line, each station having a dial and a source of signal potential thereat, a station identification system comprising means under the control of the dial of each station for applying said signal potential to the line during the line interruptions representing at least one digit of a called number, a different digit with each station, and means at the central office selectively responsive to the application of the potential to the line during the line interruptions, whereby a register at the central office is operated to indicate the station dialing a called number.

7. In an automatic telephone system including a line circuit, a plurality of stations thereon, a central office terminating one end of said line, and a calling device at each station adapted to be operated repeatedly from normal to a plurality of positions and to restore to normal, during each of which restorations the line circuit is momentarily interrupted at least once, depending on the position to which said device is operated, to thereby transmit pulses representing a digit of a called number, a source of signal potential at each station, means under the control of each of said calling devices for making effective the signal potential upon the operation of one of said devices corresponding to at least one given digit, different with each station, and for applying said effective potential to the line during the interruptions to same when said one device subsequently restores, and means at the central office responsive during said line interruptions to the simultaneous application of said effective potential to the line to selectively register said application in accordance with its occurrence in the series of digits of the called number transmitted by repeated operation and restoration to normal of said one device.

8. In an automatic telephone system including a central office, a line terminating therein, and a plurality of stations on said line, each station having a dial and a source of signal potential thereat, said dial adapted to be operated repeatedly from normal to a plurality of positions and to restore to normal, during each of which restorations the line circuit is momentarily interrupted at least once, depending on the position to which said dial is operated, to thereby transmit pulses representing a digit of a called number, a station identification system comprising means under the control of each of said calling dials for making effective the signal potential upon the operation of one of said dials corresponding to at least one given digit, different with each station, and for applying said effective potential to the line during the interruptions to same when said one dial subsequently restores, and means at the central office responsive during said line interruptions to the simultaneous application of said effective potential to the line to selectively register said application in accordance with its occurrence in the series of digits of the called number transmitted by repeated operation and restoration to normal of said one dial.

9. In an automatic telephone system including a central office, a line terminating therein, a plurality of stations on said line, and a calling device at each station, a source of signal potential at each station, means under the control of each station calling device for applying said potential to the line simultaneously with each digit of a combination of digits of a called number transmitted by one of said calling devices, said combination of digits differing for each station, and means at the central office adapted to selectively register the transmission of said potential with different combinations of digits of called numbers.

10. In an automatic telephone system including a line circuit, a plurality of stations thereon, a central office terminating one end of said line, and a calling device at each station for transmitting groups of line interruptions representing digits of a called number, a source of signal potential of each station, means under the control of each of said calling devices for connecting the signal potential to the line during each group of the interruption intervals of a combination of digits of the called number, said combination of digits differing for each station, and means at the central office responsive during each of said groups of line interruptions comprising said combination of digits to the simultaneous connection of said potential source to the line to selectively register the connection of said source to said line in accordance with its occurrence in the combination of digits so transmitted.

11. In an automatic telephone system including a central office, a line terminating therein, a plurality of stations on said line, and a dial at each station adapted to interrupt the line at least once in response to each operation and return to normal of the dial to transmit the impulses of a digit of a called number, a source of signal potential at each station, means under the control of each station dial for applying said potential to the line during the line interruptions representing each of a combination of digits, a different combination with each station, and means at the central office responsive to interruptions of the line and simultaneous application thereto of said signal potential to selectively register the application to the line of said signal potential in accordance with the combination of digits, during the line interruptions of which the said potential was so applied.

12. In an automatic telephone system including a central office, a line terminating therein, and a plurality of stations on said line, each station having a dial and a source of signal potential thereat, a station identification system comprising means under the control of the dial of each station for applying said potential to the line simultaneously with each of a combination of digits of a dialed number, a different combination with each station, and means at the central office selectively responsive to the simultaneous application to the line of the potential and each of the digits of the combination, whereby a register at the central office is operated to indicate the station dialing a called number.

13. In an automatic telephone system including a central office, a line terminating therein, and a plurality of stations on said line, each station having a dial and a source of signal potential thereat, a station identification system comprising means under the control of the dial of each station for applying said signal potential to the line during the line interruptions representing each of a combination of digits of a called number, a different combination with each station, and means at the central office selectively responsive to the application of the potential to the line during the line interruptions representing each of the digits of the combination, whereby a register at the central office is operated to indicate the station dialing a called number.

14. In an automatic telephone system including a line circuit, a plurality of stations thereon, a central office terminating one end of said line, and a calling device at each station adapted to be operated repeatedly from normal to a plurality of positions and to restore to normal, during each of which restorations the line circuit is momentarily interrupted at least once, depending on the position to which said device is operated, to thereby transmit pulses representing a digit of a called number, a source of signal potential at each station, means under the control of each of said calling devices for making effective the signal potential upon the operation of one of said devices corresponding to each of a given combination of digits, a different combination with each station, and for applying said effective potential to the line during the interruptions to same when said one device subsequently restores, and means at the central office responsive during said line interruptions to the simultaneous application of said effective potential to the line to selectively register said application in accordance with its occurrence in the given combination of digits of the called number transmitted by repeated operation and restoration to normal of said one device.

15. In an automatic telephone system including a central office, a line terminating therein, and a plurality of stations on said line, each station having a dial and a source of signal potential thereat, said dial adapted to be operated repeatedly from normal to a plurality of positions and to restore to normal, during each of which restorations the line circuit is momentarily interrupted at least once, depending on the position to which said dial is operated, to thereby transmit pulses representing a digit of a called number, a station identification system comprising means under the control of each of said calling dials for making effective the signal potential upon the operation of one of said dials corresponding to each of a given combination of digits, a different combination with each station, and for applying said effective potential to the line during the interruptions to same when said one dial subsequently restores, and means at the central office responsive during said line interruptions to the simultaneous application of said effective potential to the line to selectively register said application in accordance with its occurrence in the given combination of digits of the called number transmitted by repeated operation and restoration to normal of said one dial.

16. In an automatic telephone system including a line circuit, a plurality of stations thereon, a central office terminating one end of said line, and a calling device at each station adapted to be operated repeatedly from normal to a plurality of positions and to restore to normal, during each of which restorations the line circuit is momentarily interrupted at least once, depending on the position to which said device is operated, to thereby transmit pulses representing a digit of a called number, a source of ground signal potential at each station, means under the control of each of said calling devices for making effective the ground potential upon the operation of one of said devices corresponding to each of two given digits, a different pair of digits for each station, and for applying said effective ground to the line during the interruptions to same when said one device subsequently restores, and means at the central office responsive during said line interruptions to the simultaneous application of said effective ground to the line to selectively register said application in accordance with its occurrence in the given pair of digits of the called number transmitted by repeated operation and restoration to normal of said one device.

17. In an automatic telephone system including a central office, a line terminating therein, and a plurality of stations on said line, each station having a dial and a source of ground signal potential thereat, said dial adapted to be operated repeatedly from normal to a plurality of positions and to restore to normal, during each of which restorations the line circuit is momentarily interrupted at least once, depending on the position to which said dial is operated, to thereby transmit pulses representing a digit of a called number, a station identification system comprising means under the control of each of said calling dials for making effective the ground potential upon the operation of one of said dials corresponding to each of two given digits, a different pair of digits for each station, and for applying said effective ground to the line during the interruptions to same when said one dial subsequently restores, and means at the central office responsive during said line interruptions to the simultaneous application of said effective ground to the line to selectively register said applications in accordance with its occurrence in the pair of given digits of the called number transmitted by repeated operation and restoration to normal of said one dial.

18. The structure of claim 7 wherein said means for making effective the signal potential and for applying said effective potential to the line includes first means under the control of each of said calling devices for making effective the signal potential upon the operation of one of said devices corresponding to at least one given digit, different with each station, and second means under the control of each of said calling devices for applying said effective potential to the line during the interruption to same when said one device subsequently restores.

19. The structure of claim 8 wherein said means for making effective the signal potential and for applying said effective potential to the line includes first means under the control of each of said calling dials for making effective the signal potential upon the operation of one of said dials corresponding to at least one given digit, different with each station, and second means under the control of each of said calling dials for applying said effective potential to the line during the interruption to same when said one dial subsequently restores.

20. The structure of claim 14 wherein said means for making effective the signal potential and for applying said effective potential to the line includes first means under the control of each of said calling devices for making effective the signal potential upon the operation of one of said devices corresponding to each of a given combination of digits, a different combination with each station, and second means under the control of each of said calling devices for applying said effective potential to the line during the interruption to same when said one device subsequently restores.

21. The structure of claim 15 wherein said means for making effective the signal potential and for applying said effective potential to the line includes first means under the control of each of said calling dials for making effective the signal potential upon the operation of one of said dials corresponding to each of a given combination of digits, a different combination with each station, and second means under the control of each of said calling dials for applying said effective potential to the line during the interruption to same when said one dial subsequently restores.

22. The structure of claim 16 wherein said means for making effective the ground potential and for applying said effective ground to the line includes first means under the control of each of said calling devices for making effective the ground potential upon the operation of one of said devices corresponding to each of two given digits, a different pair of digits for each station, and second means under the control of each of said calling devices for applying said effective ground to the line during the interruption to same when said one device subsequently restores, 23. The structure of claim 17 wherein said means for making effective the ground potential and for applying said effective ground to the line includes first means under the control of each of said calling dials for making effective the ground potential upon the operation of one of said dials corresponding to each of two given digits, a different pair of digits for each station, and second means under the control of each of said calling dials for applying said effective ground to the line during the interruption to same when said one dial subsequently restores.

OSCAR MYERS.

REFERENCES CITED

The following references are of record in the file of this patent:

UNITED STATES PATENTS

| Number | Name | Date |
|---|---|---|
| 2,013,171 | Peterson | Sept. 3, 1935 |
| 2,410,520 | Ostline | Nov. 5, 1946 |